United States Patent [19]

Jacobsen

[11] Patent Number: 5,090,443

[45] Date of Patent: Feb. 25, 1992

[54] FLUID LEVEL CONTROL FLOAT VALVE

[76] Inventor: Paul S. Jacobsen, 1733 Hampshire Ave., St. Paul, Minn. 55116

[21] Appl. No.: 734,885

[22] Filed: Jul. 24, 1991

[51] Int. Cl.$^5$ ............... F16K 31/18; F16K 33/00
[52] U.S. Cl. ................... 137/429; 137/451; 47/40.5; 47/79; 73/322.5; 222/67; 251/5; 251/7
[58] Field of Search .............. 137/429, 430, 433, 451; 47/40.5, 48.5, 79; 73/305, 306, 309, 322.5; 141/198; 222/67; 251/5, 7

[56] References Cited

U.S. PATENT DOCUMENTS

| Re. 28,446 | 6/1975 | Buswell | 137/451 |
|---|---|---|---|
| 430,968 | 6/1890 | Minor | 137/451 |
| 1,010,562 | 12/1911 | Woodward | 137/451 |
| 1,010,562 | 12/1911 | Woodward . | |
| 2,241,636 | 5/1941 | Eliason | 137/451 |
| 3,101,570 | 8/1963 | Lienard | 47/48.5 |
| 3,270,770 | 9/1966 | Wilson | 73/322.5 |
| 3,670,751 | 6/1972 | Buswell . | |
| 3,850,209 | 11/1974 | Zweigardt | 137/451 |
| 3,931,818 | 1/1976 | Goldowsky . | |
| 3,996,960 | 12/1976 | Martinez-Lozano . | |
| 4,300,311 | 11/1981 | Marchant . | |
| 4,825,587 | 5/1989 | Stancil | 47/40.5 |
| 4,850,137 | 7/1989 | Foster | 47/40.5 |

FOREIGN PATENT DOCUMENTS

| 113761 | 3/1899 | Fed. Rep. of Germany | 137/451 |
|---|---|---|---|
| 625192 | 8/1978 | U.S.S.R. | 137/451 |

Primary Examiner—George L. Walton

[57] ABSTRACT

A valve for controlling the level of fluids in basins, such as stands for cut trees, aquariums, or hydroponic plant basins. The valve 6 includes a rigid fluid conduit 26 passing through the wall of a float chamber 16, in order to transmit fluid into a flexible tubing 28 connected to the portion of the rigid fluid conduit 26 inside the float chamber 16. In the valve's open position, the flexible tubing 28 is maintained in a partially bent postion, riding on the upper end of a float 30 contained within the float chamber 16. As the fluid enters the float chamber 16, and exits into basin 8, the fluid level rises causing the float 30 to rise in float chamber 16. The rising float further bends the flexible tubing 28, causing it to collapse and block the flow of fluid therethrough. As the fluid in basin 8 falls, the flexible tubing 28 returns to its original position, and the flow of fluid through the valve resumes.

20 Claims, 5 Drawing Sheets

FLUID LEVEL CONTROL FLOAT VALVE

BACKGROUND

1. Field of Invention

This invention relates to float valves for controlling the level of fluid in a basin, and more particularly concerns valves for controlling the level of fluids in basins such as Christmas tree stands, aquariums, or hydroponic plant basins.

2. Description of Prior Art

The vast majority of float valves rely on a float attached at the terminal end of a rod or lever arm. In turn, the lever arm activates a separate valve mechanism. Any valve apparatus which relies on a float at the end of a lever arm has several inherent disadvantages. First, it requires substantial space for operation of the lever arm, and thus cannot be utilized in a fluid basin of atypical dimensions or of a size smaller than the lever arm member. Second, the lever arm is subject to obstruction by a foreign object in the basin, which would cause the valve to malfunction. Third, the level of fluid in the basin can be only adjusted through a trial and error method of adjusting the float on the lever arm or by bending the lever arm.

Floats have also been used in combination with pinch valves. Pinch valves are typically comprised of a flexible tube that is collapsed to control the flow of fluid. Usually, the pinch valve is activated by manual operation and not by a float. When combined with a float, however, pinch valves also have relied on the float being located at the end of a lever arm. Each of the disadvantages discussed above concerning the use of lever arms for float valves is applicable to lever arms on a pinch valve. In addition, a lever arm on a pinch valve has further disadvantages, as it is difficult to maintain the lever arm in a fixed plane because of the flexible nature of the tube comprising the pinch valve.

OBJECTS AND ADVANTAGES

Accordingly, several objects and advantages of the present invention are:

(a) a fluid control valve that is compact, so that the valve may be utilized in basins of atypical shape or basins that have insufficient space for the operation of a lever arm;

(b) a fluid control valve that is self-contained, so that all moving parts are within an external housing, thereby protecting its essential parts from external damage;

(c) a fluid control valve with few moving parts, thereby reducing the likelihood of failure of the valve as a result of damage to an essential element;

(d) a fluid control valve that is inexpensive to manufacture because the valve has few components all of which are made of commonly known materials;

(e) a fluid control valve in which the liquid level in the fluid reservoir may be easily adjusted by raising or lowering the valve structure itself without having to reposition bulky floats or lever arms.

Further objects and advantages of this invention will become apparent from a consideration of the drawings and ensuing description.

DESCRIPTION OF THE PREFERRED EMBODIMENTS

Figure 1:
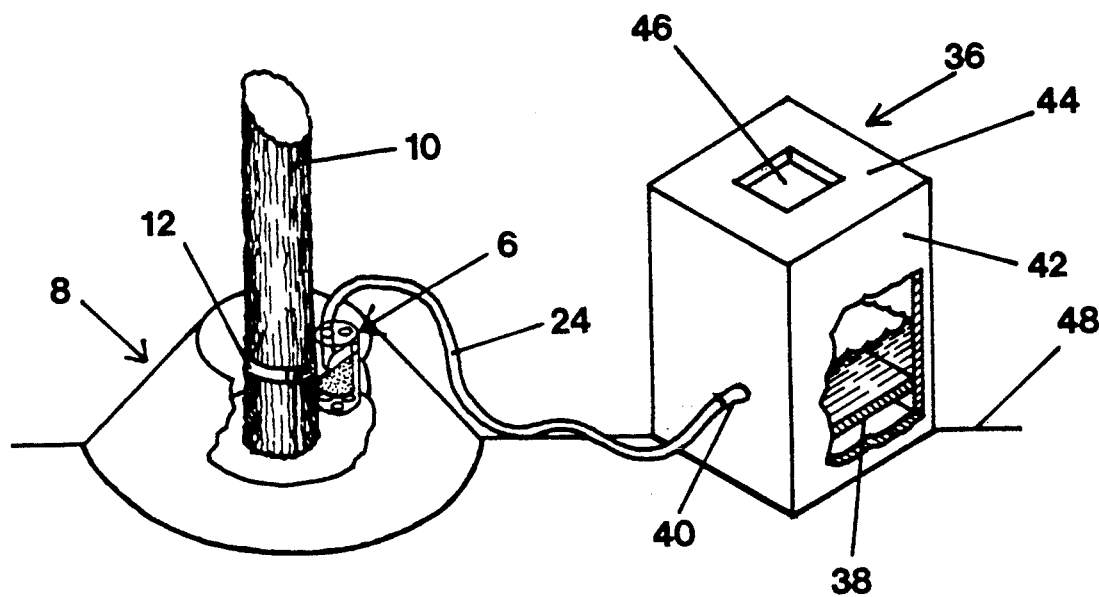
FIG. 1 is a perspective view which shows an arrangement of the valve structure of this invention in a Christmas tree stand basin with a remote reservoir supplying liquid to the valve.

An embodiment of the valve and its associated apparatus is illustrated in FIG. 1. In general, fluid reservoir 36 supplies a fluid, such as water, through flexible conduit 24 to valve structure 6 located in tree stand 8. FIGS. 2, 2A, 2B and 3 illustrate the operation of the valve in greater detail.

Figure 2:
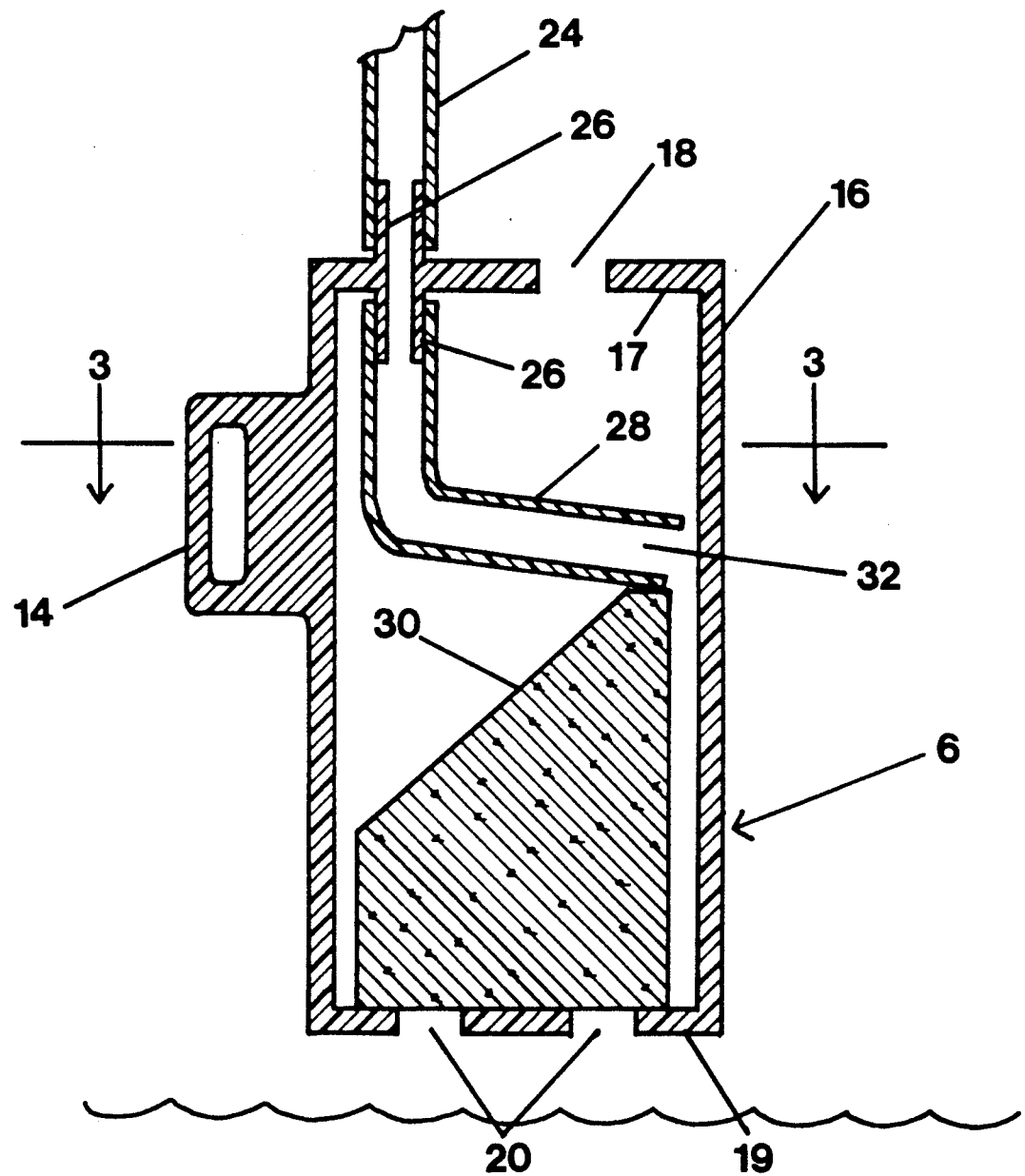
FIG. 2 is a sectional view of the valve mounted in a basin of a tree stand with the float in its lowest, and thereby open, position.
Figure 2A:
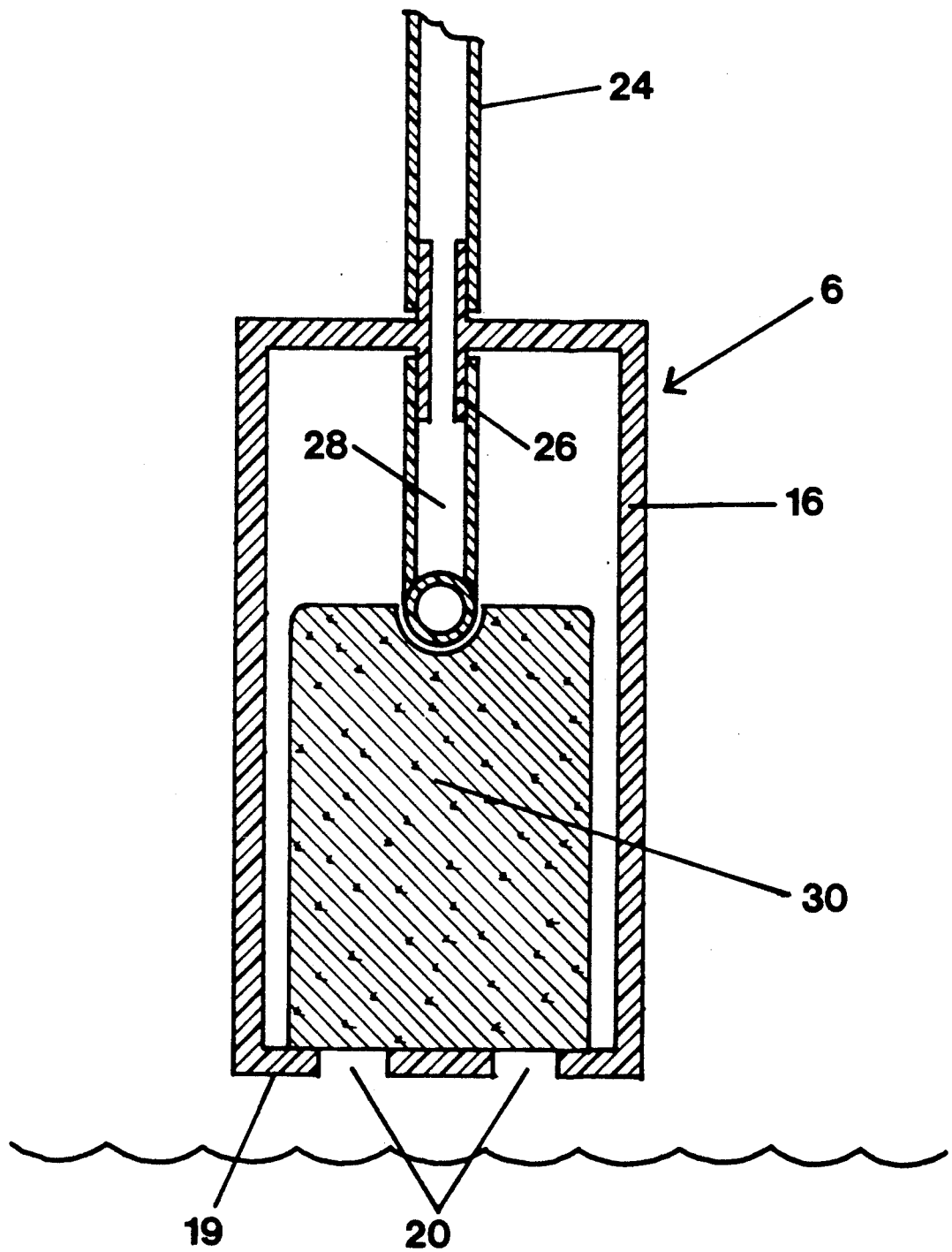
FIG. 2A is also a sectional view of the valve, but viewed from a perspective 90 degrees from that shown in FIG. 2.

FIG. 2 shows the valve in an open position located in a basin containing a fluid. Connecting bracket 14 is an integral part of or mechanically fastened to float chamber 16, and is designed to be strapped to a tree base or other fixture in a fluid basin. Alternatively, connecting bracket 14 is comprised of one element of a hook and loop fastener, with the hook material wrapped around the tree base 10 (as shown in FIG. 1) and the loop material attached to float chamber 16, replacing connecting bracket 14. Any other method of securing float chamber 16 is acceptable, as long as float chamber 16 is maintained in a vertical and stable position.

In its preferred embodiment, float chamber 16 is a hollow cylindrical tube with an upper wall 17 and a lower wall 19. Upper wall 17 contains an air port or vent 18 of sufficient size to allow free movement of air between the inner chamber of float chamber 16 and the ambient air, but not so large as to threaten the structural integrity of float chamber 16. Fluid egress ports 20 are located in the lower wall 19 of float chamber 16. Fluid ports 20 must be of sufficient size to allow the unrestricted egress of fluid from float chamber 16. Fluid ports 20 could also be comprised of only one port located in any part of lower wall 19 or in the lower side wall of float chamber 16.

Flexible fluid conduit 24 delivers fluid through a liquid-tight connection to rigid fluid conduit 26. Rigid fluid conduit 26 is permanently attached to upper wall 17, or is an integral part of float chamber 16. The connection between flexible fluid conduit 24 and rigid fluid conduit 26 must allow the free flow of fluids between both such conduits, but prevent leakage of any fluids at such connection.

Flexible tubing 28 is connected to rigid fluid conduit 26 by any number of means, including the stretching of flexible tubing 28 over the outer edges of rigid fluid conduit 26, the clamping of one to the other, or like means. Flexible tubing 28 must be comprised of a elastomeric material with walls that begin to collapse when the tube is bent to approximately a 90 degree angle, yet still allow the free flow of fluid through it. However, once flexible tubing 28 is bent to approximately the 45 degree angle shown in FIG. 2B, it must completely collapse and seal against itself, so as to prevent the flow of any fluids through it. Flexible tubing 28 is most conveniently made of natural latex rubber, but could also be made of other natural or synthetic elastomeric materials.

While the valve is in an open position, float 30 rests on the lower wall 19 of float chamber 16. In addition to the force of gravity, float 30 is maintained upon lower wall 19 by the downward pressure caused by flexible tubing 28 against the top of float 30, as flexible tubing 28 seeks to restore itself to a straightened position in line with rigid fluid conduit 26.

Float 30 only contacts flexible tubing 28 at its distal end located near flexible tubing outlet port 32. The distal end of flexible tubing 28 rides in float depression 34, seen most clearly in FIG. 2A. Float depression 34 is somewhat larger in diameter than flexible tubing 28. The downward force of flexible tubing 28 causes the distal end of flexible tubing 28 to maintain itself in float depression 34. This allows the distal end of flexible tubing 28 to remain centered on the top of float 30 throughout operation of the valve, which is critical to its performance.

Float 30 is typically of cylindrical design as viewed from a vertical perspective. Viewed from a horizontal perspective, float 30 has a flat base and vertical walls perpendicular to such flat base. A portion of the top of float 30 is at approximately a 45 degree angle to the vertical sides of float 30, so as to prevent contact of float 30 with flexible tubing 28 except where float depression 34 contacts flexible tubing 28 at its distal end near its outlet port 32.

Float 30 is constructed of a material such as expanded polystyrene or consists of a hollow structure made of thin solid walls. Float 30 must be of sufficient size to overcome the downward force caused by the tendency of flexible tubing 28 to straighten itself out in line with rigid fluid conduit 26. When used in combination with flexible tubing 28 comprised of natural latex rubber with an internal diameter of 3.175 millimeters ($\frac{1}{8}$ inch) and a wall thickness of 0.79375 millimeters (1/32 inch), float 30, if constructed of expanded polystyrene, should have a minimum volume of approximately 20 cubic centimeters ($1\frac{1}{4}$ cubic inches).

Figure 3:
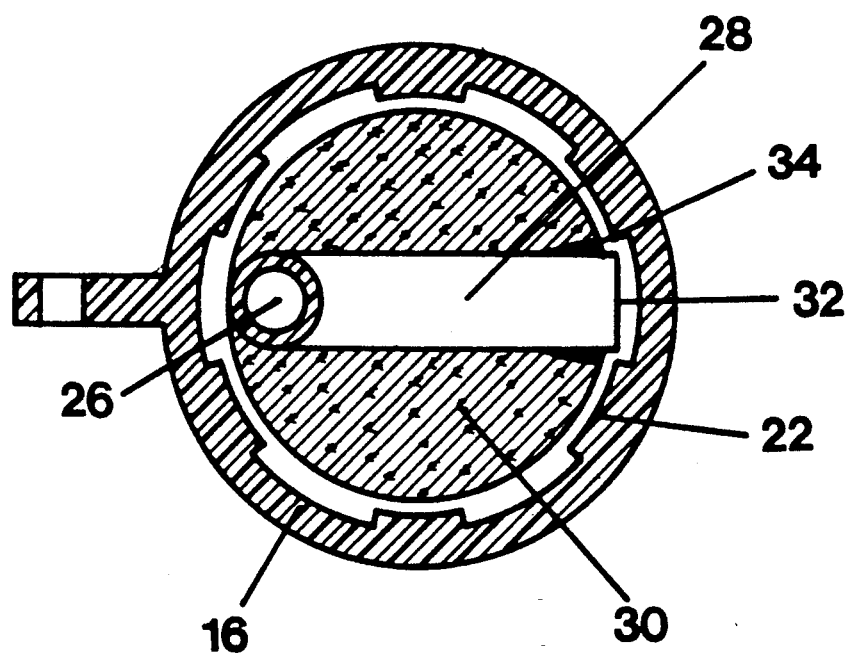
FIG. 3 is a vertical view of the valve taken along line 3—3 of FIG. 2.

FIG. 3 depicts a section view of the valve taken through the line 3—3 of FIG. 2. A plurality of splines 22 are projected inwardly from float chamber 16 for the purpose of centering the float. Alternatively, a plurality of splines or tabs can extend outwardly from float 30 to accomplish the same purpose. Such splines avoid the disadvantages of a tilting float or a float tending to contact the sides of float chamber 16 which may allow surface tension forces to impede the motion of float 30 as it travels upwardly or downwardly in float chamber 16. Further, such splines permit unrestricted flow of fluids from the inside of float chamber 16, past float 30, and out fluid port 20.

FIG. 3 also depicts the central location of flexible tubing 28 upon float 30 in float depression 34. As discussed above, float depression 34 maintains flexible tubing 28 centered upon the top of float 30. There must be sufficient clearance between the distal end of flexible tubing 28 and the inside of float chamber 16 to both prevent any contact between flexible tubing 28 and float chamber 16, and to allow fluid to flow freely from fluid outlet 32 into float chamber 16.

As shown in FIG. 1, valve structure 6 is supplied with fluid from fluid reservoir 36, which is comprised of walls 42, top 44, fluid inlet 46, raised bottom 38 and outlet 40. Outlet 40 connects to flexible conduit 24 which travels over the top edge of tree stand basin 8, and connects to valve structure 6. Outlet 40 is preferably at or near raised bottom 38, to allow the complete draining of fluid reservoir 36.

OPERATION

As shown in FIG. 1, valve structure 6 is securely attached to tree base 10 in a vertical position by passing strap 12 through connecting bracket 14 (FIG. 2) and wrapping strap 12 around tree base 10. All of valve structure 6 must be below the upper limits of basin 8 to prevent any overflow of water from basin 8.

Thereafter, reservoir 36 is filled with water, through fluid inlet 46. By gravity, the water flows through outlet 40, and through flexible conduit 24. As shown in FIG. 2 when the valve is in its open position, the water thereafter flows through rigid conduit 26, into flexible tubing 28, and through outlet 32. The water then flows down the sides of float chamber 16 around the outside parameter of float 30 and out fluid ports 20 into a basin of water. Rising water in float chamber 16 causes float 30 to momentarily rise a small amount, which permits the passage of water around the bottom of float 30 and thereafter through fluid ports 20.

Figure 2B:
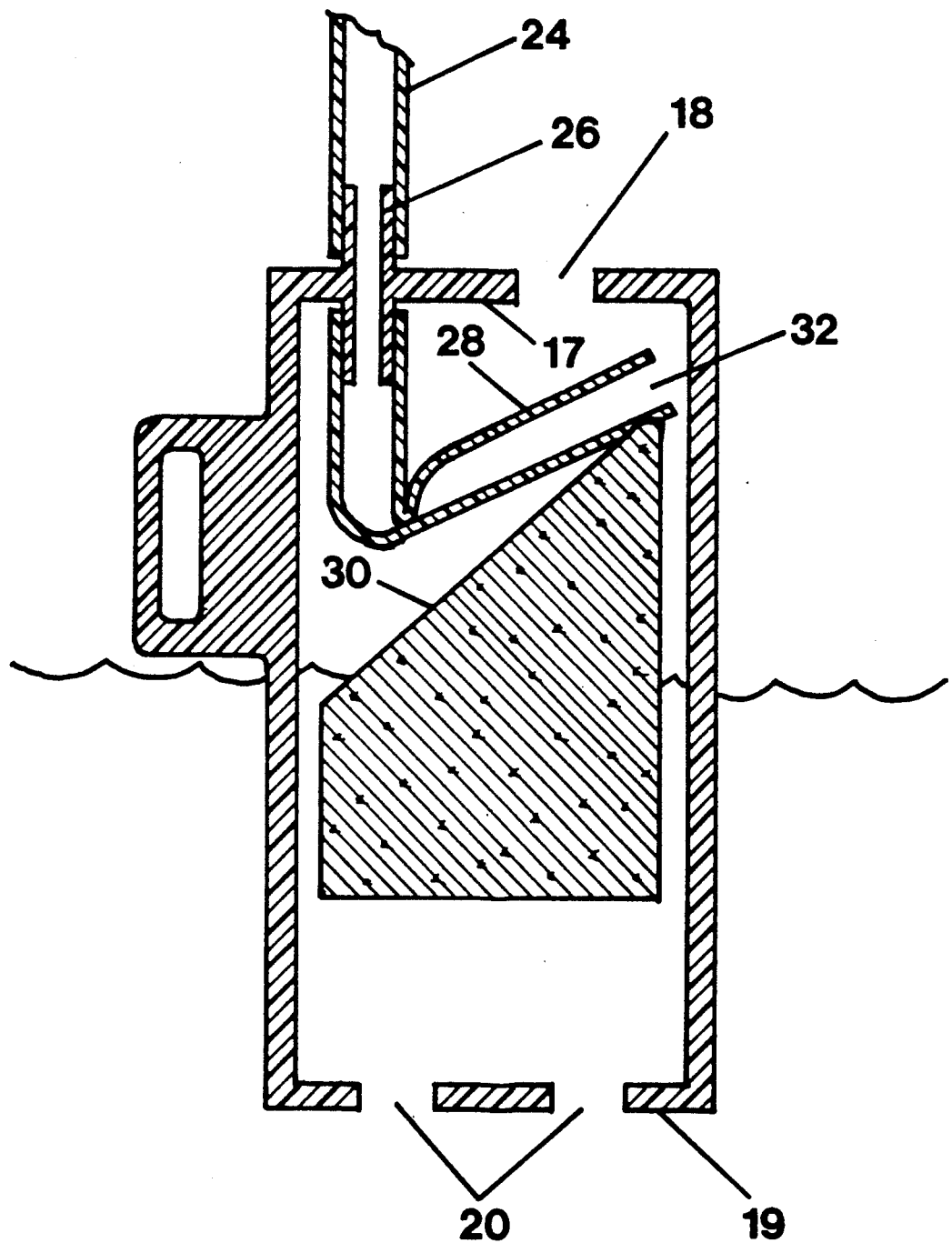
FIG. 2B is a sectional view of the valve similar to that shown in FIG. 2, but with the float in its uppermost, and thereby closed, position.

Rising water in a basin, as depicted in FIG. 2B, causes float 30 to rise in float chamber 16. The rise of float 30 causes flexible tubing 28 to bend until it collapses and stops the flow of water therein. While the water and float are rising, air from inside float chamber 16 is expelled out of air port or vent 18.

As the fluid level lowers in float chamber 16, the tendency of flexible tubing 28 to seek a straightened position, along with gravity, causes float 30 to lower itself in float chamber 16. When float 30 nears contact with lower wall 19, flexible tubing 28 is restored to its original position depicted in FIG. 2, once again allowing the flow of water from reservoir 36 through the valve. The water level in a basin, such as tree stand basin s shown in FIG. 1, can be easily and accurately adjusted by lowering or raising valve structure 6 on tree base 8 to the most optimum level.

SUMMARY, RAMIFICATIONS, AND SCOPE

Accordingly, it can be seen that a novel fluid level control float valve has been provided which will maintain a predetermined level of fluid within basin. The fluid control valve is compact and self-contained, and thus can be placed in a variety of odd shaped basins in which there would be no room for lever arms to operate. Because there are no external moving parts, the valve is less subject to damage or misadjustment, as can happen when the valve operation depends on the action of a lever arm. The valve can be inexpensively manufactured due to its small number of common components. Further, the fluid level is easily and accurately accomplished by adjusting the height of the valve device itself.

Although the invention has been shown and described in connection with a preferred embodiment, many modifications, substitutions and additions may be made which are within the intended scope of the claims. The valve will accurately maintain the level of fluid in an aquarium, in a plant container for hydroponic irrigation, or the like. When used as a device to automatically water trees, many other methods can be used to attach the valve to the tree or stand, such as clips, hook and loop fasteners, elastic bands, screws, thumbtacks, or any other fastening means. Further, depending on the embodiment, the valve chamber can be constructed in many different shapes and forms other than cylindrical, such as square or oblong. Accordingly, the scope of this invention should be determined not by the embodiments above illustrated, but by the claims and their legal equivalents.

What is claimed is:

1. A valve structure to control the level of fluid in a basin comprising:
   a. a housing having a valve chamber therein and further having a rigid tube passing therethrough the communicate fluid into said valve chamber, said housing further having an aperture for the egress of fluid from said valve chamber into said basin,
   b. a flexible tube of a specified length having an inlet portion connected to said rigid tube and an outlet portion extending into said valve chamber, said outlet portion terminating in an outlet open end, and
   c. a buoyant float member contained within said valve chamber, said float having a side wall and a slanted top portion with respect to said side wall, and said float having a top section connecting an upper end of said slanted top portion and an upper end of said side wall, whereby said flexible tubing is loosely received and guided thereon, said top section making direct contact with said flexible tube outlet portion to control fluid flow into said valve chamber by bending said outlet portion to shut off fluid flow through said flexible tube in response to movement of said float as a result of a change in the fluid level in said valve chamber.

2. The valve structure of claim 1, wherein said float member has a side wall and a slanted top surface with respect to said side wall and is constructed and arranged to contact and guide said flexible tube.

3. The valve structure of claim 1, wherein said flexible tube has a predetermined diameter and said top section has a depression therein for loosely receiving and guiding said flexible tube, and said depression has a diameter slightly larger than said flexible tube diameter.

4. The valve structure of claim 1, wherein said housing has an inside surface with a plurality of parallel channels.

5. The valve structure of claim 1, wherein said housing has a top portion with a vent and wherein said rigid tube extends through said top portion at a peripheral location.

6. The valve structure of claim 1, wherein said float member has a flat bottom surface and a slanted top surface of between 30 to 60 degrees with respect to said flat bottom surface and further having a depression therein to receive and guide said flexible tube.

7. The valve structure of claim 1, wherein said float member is constructed of polystyrene.

8. The valve structure of claim 1, wherein said housing has means to mount said valve structure within said basin.

9. The valve structure of claim 1, wherein said basin is a stand for cut trees.

10. The valve structure of claim 1, wherein said basin is an aquarium.

11. The valve structure of claim 1, wherein said basin is a hydroponic plant basin.

12. An apparatus to supply fluid to a basin comprising:
    a. a remote reservoir for said fluid,
    b. a valve structure within said basis, having a housing, a fluid ingress means, a flexible tube with a specified length having an inlet portion communicating with said fluid ingress means and an outlet portion extending into said valve structure, a float member having a side wall and a slanted top portion with respect to said side wall, said float member having a channel disposed between one end of said side wall and one end of said slanted portion for loosely receiving and guiding said outlet portion of said flexible tube to control fluid flow into said basin by bending said flexible tube to shut off fluid flow through said flexible tube in response to movement of said float as a result of a change in the fluid level in said valve chamber, and
    c. fluid supply means in communication with said reservoir and said fluid ingress means.

13. The apparatus of claim 12, wherein said basis is a stand for cut trees.

14. The apparatus of claim 12, wherein said valve housing has a top with a rigid tube extending therethrough.

15. The apparatus of claim 12, wherein said valve housing has a bottom with an aperture therethrough for the egress of fluid and wherein said housing has a top with a vent.

16. The apparatus of claim 12, wherein said valve housing has means for mounting said valve housing within said basin.

17. The apparatus of claim 12, wherein said fluid supply means is comprised of a remote reservoir and a delivery tube extending therefrom.

18. The apparatus of claim 12, wherein said flexible tubing is constructed of an elastomeric material.

19. The apparatus of claim 18, wherein said flexible tubing is selected from the group of materials consisting of 20. A valve assembly to control the fluid level in a basin, comprising:
    a. a unitary, molded housing having walls defining a valve chamber and further having fluid ingress and egress means communicating with said valve chamber at the top and bottom, respectively, said walls further having at least one channel disposed axially in the interior of said walls.
    b. a flexible and collapsible tube having a specified length with an inlet portion and a distal portion extending into said valve chamber and communicating with said fluid ingress means at said inlet portion, and
    c. a buoyant float member with side walls and a slanted top portion with a receiving means disposed between said side walls and said slanted top portion to loosely guide said flexible tube distal portion to control fluid flow into said chamber by bending said flexible tube to shut off fluid flow therein in response to movement of said float as a result of a change in the fluid level in said valve chamber.

* * * * *

UNITED STATES PATENT AND TRADEMARK OFFICE
CERTIFICATE OF CORRECTION

PATENT NO. : 5,090,443

DATED : February 25, 1992

INVENTOR(S) : Paul S. Jacobsen

It is certified that error appears in the above-identified patent and that said Letters Patent is hereby corrected as shown below:

Col. 4, line 38, change "s" to "8."

Col 4, line 45, add "a" after "within" and before "basin."

Col. 5, line 10, change "the" to "to."

Col. 6, line 4, change "basis" to "basin."

Col. 6, line 21, change "basis" to "basin."

Col. 6, line 40, add "natural latex rubber and synthetic elastomeric materials and wherein said float member is constructed of polystyrene." after the word "of."

Signed and Sealed this

First Day of June, 1993

Attest:

MICHAEL K. KIRK

*Attesting Officer*     *Acting Commissioner of Patents and Trademarks*